US010129583B2

(12) United States Patent
Sriraman et al.

(10) Patent No.: US 10,129,583 B2
(45) Date of Patent: Nov. 13, 2018

(54) AUTOMATED PROGRAM GUIDE SCROLLING

(71) Applicant: Verizon Patent and Licensing Inc., Arlington, VA (US)

(72) Inventors: Venkatesan Sriraman, Chennai (IN); Sivasubramanian Parthasarathy, Pondicherry (IN); Sampath Raman, Tirunelveli (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 288 days.

(21) Appl. No.: 14/310,779

(22) Filed: Jun. 20, 2014

(65) Prior Publication Data
US 2015/0373392 A1    Dec. 24, 2015

(51) Int. Cl.
| H04N 21/422 | (2011.01) |
| H04N 21/482 | (2011.01) |
| H04N 21/81 | (2011.01) |
| H04N 5/44 | (2011.01) |
| H04N 5/445 | (2011.01) |

(52) U.S. Cl.
CPC ....... *H04N 21/4221* (2013.01); *H04N 5/4403* (2013.01); *H04N 5/44543* (2013.01); *H04N 21/4821* (2013.01); *H04N 21/8133* (2013.01); *H04N 2005/4412* (2013.01); *H04N 2005/44556* (2013.01)

(58) Field of Classification Search
CPC ........... H04N 21/4221; H04N 21/4821; H04N 21/8133; H04N 5/4403; H04N 5/44543; H04N 2005/4412; H04N 2005/44556
See application file for complete search history.

(56) References Cited

U.S. PATENT DOCUMENTS

| 5,541,738 | A | * | 7/1996 | Mankovitz | ........... | G11B 27/107 |
| | | | | | | 348/460 |
| 6,130,726 | A | * | 10/2000 | Darbee | ............... | G06F 3/147 |
| | | | | | | 348/734 |
| 6,161,026 | A | * | 12/2000 | Uchida | ............... | G08B 5/229 |
| | | | | | | 340/7.55 |
| 2001/0012025 | A1 | * | 8/2001 | Wojaczynski | ........ | G06F 3/0485 |
| | | | | | | 715/856 |
| 2001/0032333 | A1 | * | 10/2001 | Flickinger | ........... | G06Q 30/02 |
| | | | | | | 725/39 |
| 2003/0043174 | A1 | * | 3/2003 | Hinckley | ............ | G06F 3/03547 |
| | | | | | | 345/684 |
| 2003/0149984 | A1 | * | 8/2003 | Jacquelyn | ............ | G06F 3/0485 |
| | | | | | | 725/52 |
| 2004/0263377 | A1 | * | 12/2004 | Risi | ....................... | G08C 17/00 |
| | | | | | | 341/175 |
| 2005/0198588 | A1 | * | 9/2005 | Lin | ..................... | G06F 3/04855 |
| | | | | | | 715/784 |

(Continued)

FOREIGN PATENT DOCUMENTS

JP        02003162356 A    *    6/2003

*Primary Examiner* — Shourjo Dasgupta

(57) ABSTRACT

A user device may receive one or more signals in a particular sequence and within a threshold period of time from an accessory; determine a scrolling instruction corresponding to the one or more signals received in the particular sequence and within the threshold period of time; and execute the scrolling instruction to continuously scroll through a program guide, displayed by the user device, based on determining the scrolling instruction.

20 Claims, 9 Drawing Sheets

(56) References Cited

U.S. PATENT DOCUMENTS

| | | | |
|---|---|---|---|
| 2006/0274053 A1* | 12/2006 | Kinouchi | G06F 3/0234 345/173 |
| 2007/0300261 A1* | 12/2007 | Barton | G06Q 30/0241 725/58 |
| 2009/0219304 A1* | 9/2009 | Martin | G06F 3/0485 345/684 |
| 2011/0099473 A1* | 4/2011 | Son | G06F 3/04883 715/704 |
| 2012/0005628 A1* | 1/2012 | Isozu | G06F 3/04842 715/838 |

* cited by examiner

400

| Signal Sequence | Scrolling Instruction |
|---|---|
| Sequence 1:<br>3x Frequency 1<br><2 seconds | Scrolling instruction set 1:<br>Scroll direction: Right<br>Speed: 5/10<br>Stopping point: N/A |
| Sequence 2:<br>3x Frequency 2<br><2 seconds | Scrolling instruction set 2:<br>Scroll direction: Left<br>Speed: 5/10<br>Stopping point: N/A |
| Sequence 3:<br>3x Frequency 1<br><2 seconds | Scrolling instruction set 3:<br>Scroll direction: Down<br>Speed: 5/10<br>Stopping point: N/A |
| Sequence 4:<br>3x Frequency 2<br><2 seconds | Scrolling instruction set 4:<br>Scroll direction: Up<br>Speed: 5/10<br>Stopping point: N/A |
| Sequence 5:<br>4x Frequency 1<br><2 seconds | Scrolling instruction set 5:<br>Scroll direction: Right<br>Speed: 8/10<br>Stopping point: 6 seconds |
| Sequence 6:<br>1x Frequency 5 | Scrolling instruction set 6:<br>Scroll direction: Down<br>Speed: 8/10<br>Stopping point: 4 seconds |
| Sequence 7:<br>1x Frequency 6<br>1x Frequency 7 | Scrolling instruction set 6:<br>Scroll direction: Up<br>Speed: 8/10<br>Stopping point: 4 seconds |

Fig. 4

AUTOMATED PROGRAM GUIDE SCROLLING

BACKGROUND

A user device (e.g., a television in conjunction with a set-top box) may display a program guide identifying program information for content based on broadcast channels and broadcast times. A user may scroll through the program guide by selecting buttons on a remote designated for scrolling through the program guide (e.g., directional buttons).

BRIEF DESCRIPTION OF THE DRAWINGS

FIG. 4 illustrates an example data structure that may store scrolling instructions;

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may automatically scroll through an interactive program guide (e.g., a television grid guide) displayed by a user device (e.g., a set top box). As a result, fewer button presses on an accessory device used to scroll through the program guide (e.g., a remote control device) may be needed, thereby improving a user's experience and reducing power consumption on the accessory device.

Figure 1:
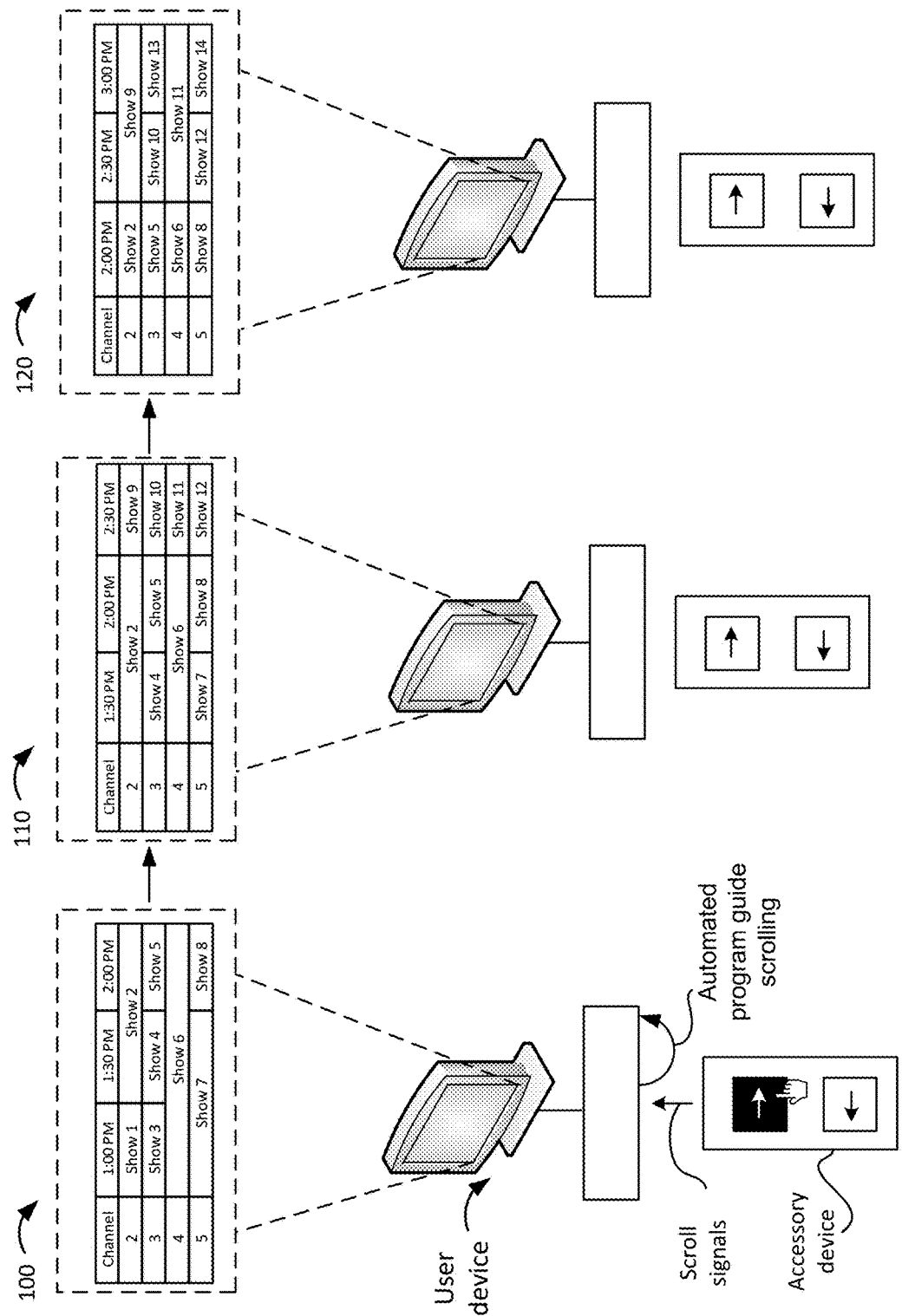
FIG. 1 illustrates an example overview of an implementation described herein.

FIG. 1 illustrates an example overview of an implementation described herein. As shown in FIG. 1, a user device may include a set-top box and a display (e.g., a television). The user device may display a program guide (e.g., in the form of a grid that identifies a broadcast schedule of television programs by time and channel). An accessory device (e.g., a remote control device, a mobile device, or the like) may be used to scroll through the program guide. The accessory device may output a signal each time a button is selected (e.g., pressed) on the accessory device. For example, the accessory device may output a "scroll signal" when a "scroll button" (e.g., a button designated to control scrolling) is pressed. The user device may scroll through the program guide in response to a scroll signal output by the accessory device. For example, when a directional right button on the accessory device is pressed, the user device may scroll through the program guide to the right (e.g., to display program information for later times). When a directional down button on the accessory device is pressed, the user device may scroll downwards through the program guide (e.g., to display program information for different channels).

In FIG. 1, the user device may automatically and continuously scroll through the program guide without repeatedly receiving scroll signals from the accessory device. That is, the user device may automatically and continuously scroll through the program guide without requiring a user to continuously press the scroll button on the accessory device. For example, as shown in interface 100, the accessory device may output scroll signals in response to button presses on the accessory device (e.g., the directional right button). In interfaces 110, and 120, the user device may automatically and continuously scroll through the program guide to the right without the user continuously press the directional right button on the accessory device. For example, the user device may automatically scroll through the program guide (as shown in interfaces 110 and 120) after a button on the accessory device is pressed greater than a threshold quantity of times within a threshold period of time (e.g., corresponding to a "double-click" a "triple-click", etc.). In some implementations, the user may discontinue the scrolling of the program guide by pressing a button on the accessory device. In some implementations, the scrolling may discontinue automatically after a particular period of time.

Figure 2:
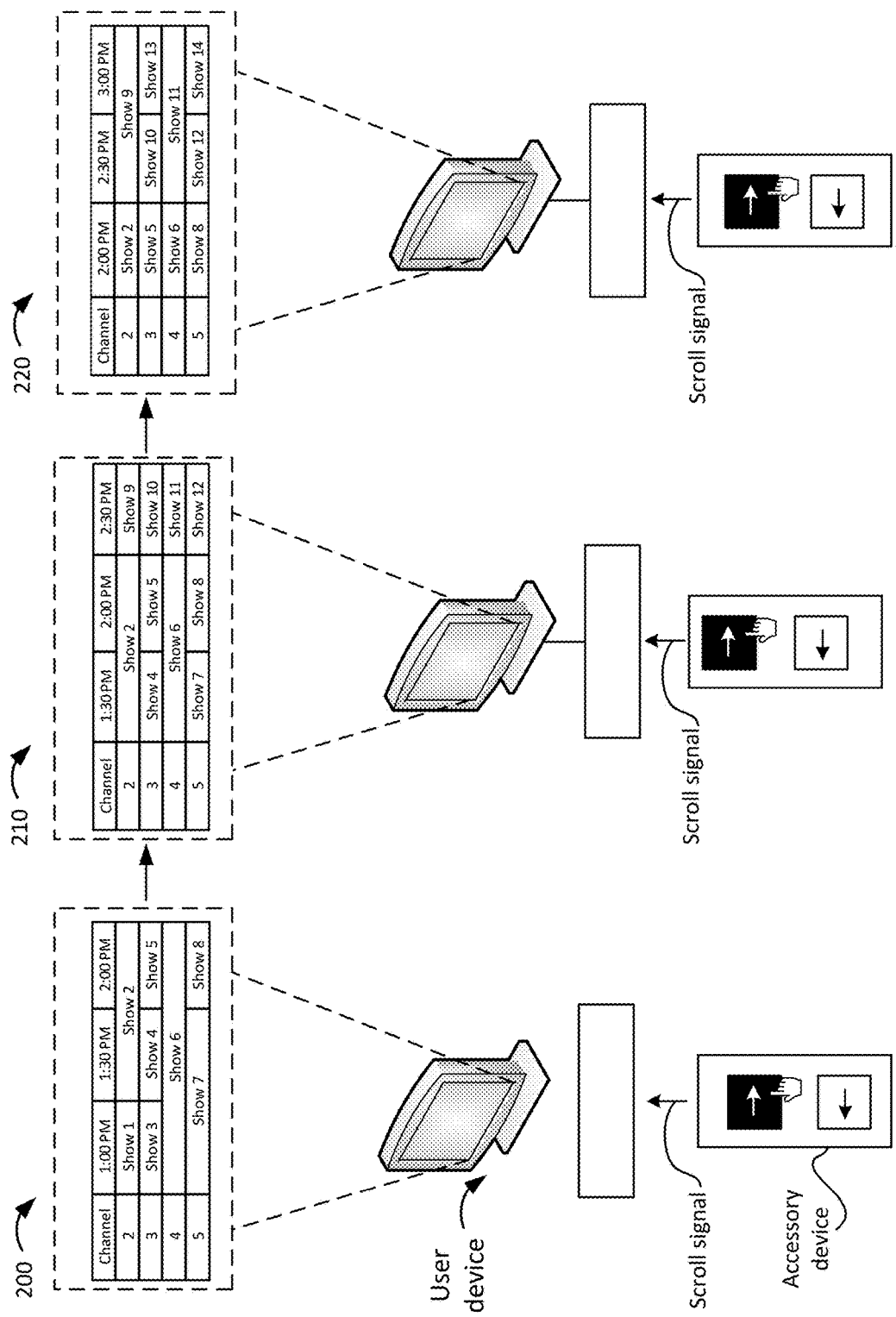
FIG. 2 illustrates a situation where automatic scrolling through a program guide may be desirable.

FIG. 2 illustrates a situation where automatic scrolling through a program guide may be desirable. As shown in FIG. 2, a user device may scroll through a program guide each time a scroll signal is received from an accessory device (e.g., each time a scroll button is pressed on the accessory device). Thus, in order for a user to continuously scroll through the program guide, the user may need to repeatedly press the scroll button, or keep the button pressed down. In a situation where the user may wish to access program guide information for a program that is several hours in the future, or for a program associated with a channel that is relatively far away in the guide, the user may need to repeatedly press the scroll button in order to access the desired program information.

Figure 3:
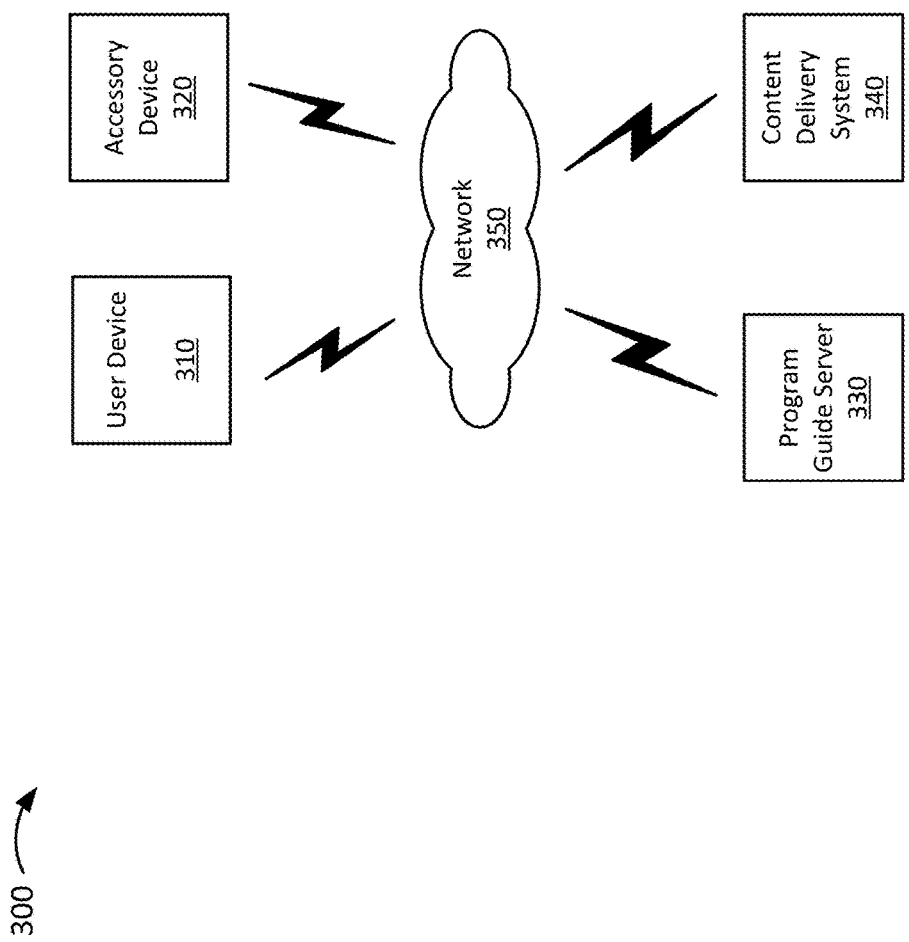
FIG. 3 illustrates an example environment in which systems and/or methods, described herein, may be implemented.

FIG. 3 is a diagram of an example environment 300 in which systems and/or methods described herein may be implemented. As shown in FIG. 3, environment 300 may include user device 310, accessory device 320, program guide server 330, content delivery system 340, and network 250.

User device 310 may include a device capable of communicating via a network, such as network 350. For example, user device 310 may correspond to a mobile communication device (e.g., a smart phone or a personal digital assistant (PDA)), a portable computer device (e.g., a laptop or a tablet computer), a desktop computer device, a set-top box, a television, and/or another type of device. In some implementations, user device 310 may present a program guide identifying program information for broadcast content and/or some other type of content. The program guide may include information received from program guide server 330. User device 310 may scroll through the program guide based on scroll signals received from accessory device 320. User device 310 may automatically and continuously scroll through the program guide based on receiving a particular scroll signal corresponding to a particular button on accessory device 320. Additionally, or alternatively, user device 310 may automatically scroll through the program guide based on receiving a particular series of scroll signals (e.g., a threshold quantity of signals in within a threshold period of time). User device 310 may store scrolling instructions that identify that user device 310 should automatically scroll through the program guide based on receiving a particular series of scroll signals.

User device 310 may receive a selection for content, and may communicate with content delivery system 340 to receive and display the content. In some implementations, user device 310 may present advertisement content (e.g., in the form of ad banners) from within the program guide, and may scroll through different ad banners while scrolling through the program guide.

Accessory device 320 may include a device that may communicate with user device 310 in order to direct user device 310 to scroll through a program guide. For example, accessory device 320 may include a remote control device (e.g., an infrared remote control device, a radio frequency (RF) remote control device, or the like), a mobile communication device, a portable computer device, a desktop computer device, etc. In some implementations, accessory device 320 may include one or more physical or virtual buttons that may control the operation of user device 310. For example, accessory device 320 may include a scroll button to direct user device 310 to scroll through a channel guide in a particular direction. In some implementations, accessory device 320 may be integrated within user device 310. For example, user device 310 may include physical and/or buttons to receive user inputs for program guide scrolling.

Accessory device 320 may output a scroll signal based on receiving a selection of a scroll button. Accessory device 320 may output a different scroll signal based on receiving selections of different scroll buttons. For example, when accessory device 320 includes an RF remote control, accessory device 320 may output a scroll signal at a particular frequency based on receiving a selection of a first scroll button, and may output a scroll signal at a different frequency based on receiving a selection of a second scroll button. When accessory device 320 includes an infrared remote control, accessory device 230 may output scroll signals in the form of pulses of light representing different binary codes. Additionally, or alternatively, accessory device 320 may output an Internet protocol (IP) based message based on receiving a selection of a scroll button. Accessory device 320 may output different messages based on receiving selections of different scroll buttons. In situations where user device 310 and accessory device 320 are implemented on the same device, accessory device 320 may output an inter-application, inter-service, or intra-application message or function call based on receiving a selection of a scroll button.

Program guide server 330 may include one or more computing devices, such as a server device or a collection of server devices. In some implementations, program guide server 330 may store program information based on broadcast channel and broadcast time. Program guide server 330 may output the program information to user device 310 for display in a program guide.

Content delivery system 340 may include one or more computing devices, such as a server device or a collection of server devices. In some implementations, content delivery system 340 may be part of a video or broadcasting head-end system and/or some other type of content delivery system. Content delivery system 340 may output content that user device 310 may receive and display. In some implementations, content delivery system 340 may output advertising content (e.g., in the form of ad banners) which user device 310 may display from within a content guide. In some implementations, content delivery system 340 may include a billing system to store information identifying an amount of time that an advertisement was displayed in a program guide. The billing system may credit an account of an advertiser based on the amount of time that the advertisement was displayed.

Network 350 may include one or more wired and/or wireless networks. For example, network 350 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 350 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, an RF network, an infrared network, and/or a combination of these or other types of networks.

The quantity of devices and/or networks in environment 300 is not limited to what is shown in FIG. 3. In practice, environment 300 may include additional devices and/or networks; fewer devices and/or networks; different devices and/or networks; or differently arranged devices and/or networks than illustrated in FIG. 3. Also, in some implementations, one or more of the devices of environment 300 may perform one or more functions described as being performed by another one or more of the devices of environment 300. Devices of environment 300 may interconnect via wired connections, wireless connections, or a combination of wired and wireless connections.

FIG. 4 illustrates an example data structure 400 that may store scrolling instructions. In some implementations, data structure 400 may be stored in a memory of user device 310. In some implementations, data structure 400 may be stored in a memory separate from, but accessible by, user device 310 (e.g., a "cloud" storage device). In some implementations, data structure 400 may be stored by some other device in environment 300, such as accessory device 320, program guide server 330, and/or content delivery system 340.

Each entry in data structure 400 may store a scrolling instruction set associated with a signal sequence. Information stored by data structure 400 may be used by user device 310 to identify a scrolling instruction set to execute when user device 310 receives signals from accessory device 320 in a particular sequence. For example, user device 310 may identify scrolling instruction set 1 when receiving signals in sequence 1, scrolling instruction set 2 when receiving signals in sequence 2, and so on. As further shown in data structure 400, each scrolling instruction set may identify a scroll direction in a program guide (e.g., left, right, up, down), a scroll speed (e.g., on a scale of 1-10 or some other scale), and a stopping point. As an example, in the context of a left or right scroll direction, a scroll speed of 1 out of 10 may indicate that the program guide should scroll at a half-hour interval every 10 seconds, a scroll speed of 5 out of 10 may indicate the program guide should scroll at a half-hour interval every five seconds, and a scroll speed of 10 out of 10 may indicate that the program guide should scroll at a half-hour interval every one second. In the context of a downward or upward scroll direction, a scroll speed of 1 out of 10 may indicate that the program guide should scroll at a one-channel interval every 10 seconds, a scroll speed of 5 out of 10 may indicate the program guide should scroll at a one-channel interval every five seconds, and a scroll speed of 10 out of 10 may indicate that the program guide should scroll at a one-channel interval every one second.

A stopping point may identify a point in which automatic scrolling of the program guide should discontinue. For example, a stopping point may be after scrolling for a particular period of time. Additionally, or alternatively, a stopping point may be after a discrete quantity of scroll operations (e.g., after scrolling through the program guide the same distance as a particular quantity of button presses). When no scroll stopping point is identified, user device 310 may continue to scroll through the program guide until receiving an indication of a selection of a button on accessory device 320.

As an example, user device 310 may identify scrolling instruction set 1 (e.g., an instruction to automatically scroll through a program guide to the right) when receiving signals having the frequency "Frequency 1" three times within a two second time period (which may sometimes be referred to as a "triple-click"). "Frequency 1" may correspond to a frequency outputted by accessory device 320 based on receiving a selection of a corresponding button (e.g., a right directional button on accessory device 320). Thus, user device 310 may identify scrolling instruction set 1 when the right directional button on accessory device 320 is selected three times within a two second time period. In an example shown in data structure 400, scrolling instruction set 1 may identify a right scroll direction, a scroll speed of 5 out of 10, and no scroll stopping point.

As another example, user device 310 may identify scrolling instruction set 7 when receiving signals having the frequencies in the order of "Frequency 6" and "Frequency 7" (e.g., when buttons on accessory device 320 corresponding to "Frequency 6" and "Frequency 7" are selected in this order). As another example, user device 310 may identify scrolling instruction set 6 when receiving a signal having the frequency "Frequency 5." For example, a button on accessory device 320 corresponding to frequency 5 may correspond to a dedicated scrolling button that may initiate automatic scrolling through the program guide after a single button press. In some implementations, information stored by data structure 400 may be customizable by a user of user device 310. Also, different users may customize button sequences that trigger automatic scrolling via a graphical user interface or an application.

While particular fields are shown in a particular format in data structure 400, in practice, data structure 400 may include additional fields, fewer fields, different fields, or differently arranged fields than are shown in FIG. 4. Also, FIG. 4 illustrates examples of information stored by data structure 400. In practice, other examples of information stored by data structure 400 are possible. For example, the signal sequence information may include voltage information and/or some other information. In some implementations, data structure 400 may store scrolling instructions based on information included in IP messages output by accessory device 320.

Figure 5:
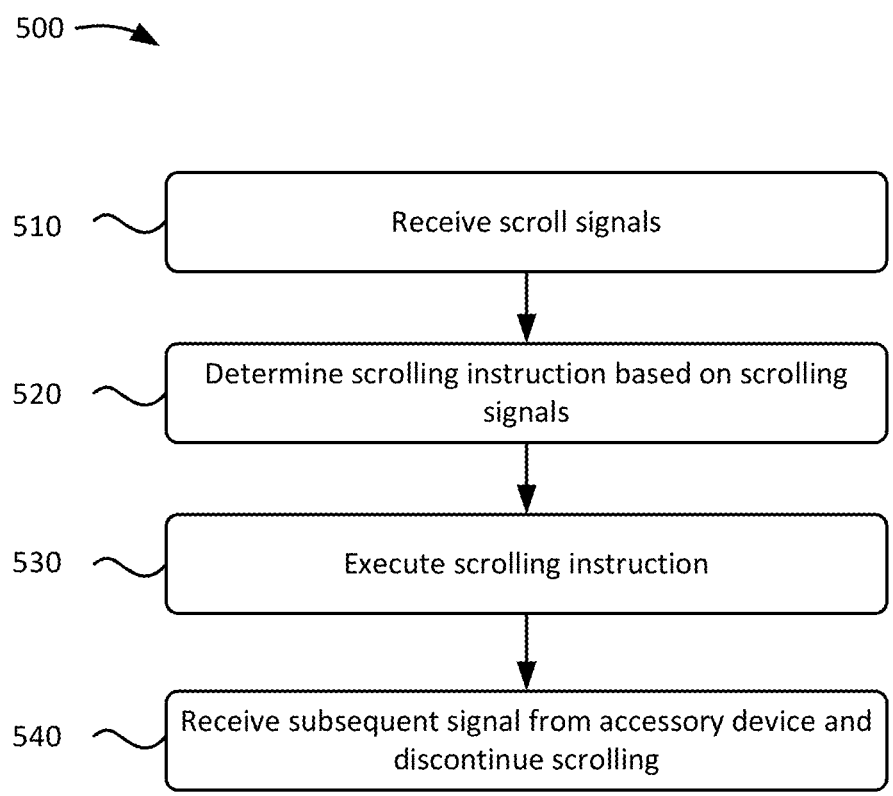
FIG. 5 illustrates a flowchart of an example process for automatically scrolling through a program guide.

FIG. 5 illustrates a flowchart of an example process 500 for automatically and continuously scrolling through a program guide. In some implementations, process 500 may be performed by user device 310. In some implementations, some or all of blocks of process 500 may be performed by one or more other devices.

As shown in FIG. 5, process 500 may include receiving scroll signals (block 510). For example, user device 310 may receive scroll signals from accessory device 320 (e.g., when scroll buttons on accessory device 320 are selected). User device 310 may receive the scroll signals when a program guide is being displayed by user device 310. As described above, in some implementations, user device 310 may include accessory device 320, and the scroll signals may be received via physical and/or virtual buttons. User device 310 may receive scroll signals in the form of RF signals, infrared signals, Bluetooth signals, near-field communication (NFC) signals, or the like. Additionally, or alternatively, user device 310 may receive an IP-based message that indicates the selection of a scroll button on accessory device 320.

Process 500 may also include determining a scrolling instruction based on the scroll signals (block 520). For example, user device 310 may determine a scroll instruction based on the frequency associated with the received scroll signals, the sequence of the scroll signals, and information stored by data structure 400 identifying the scroll instruction associated with the frequency and sequence. Additionally, or alternatively, user device 310 may determine a scroll instruction based on a message associated with the scroll signal (e.g., when the scroll signal is received in the form of an IP-based message and/or some other type of message). As described above, the scrolling instruction may identify a scrolling speed, scrolling direction, a stopping point, and/or some other manner in which user device 310 should scroll through the program guide.

Process 500 may further include executing the scrolling instruction (block 530). For example, user device 310 may execute the determined scrolling instruction. User device 310 may automatically and continuously scroll through the program guide in accordance with the scrolling instruction. For example, user device 310 may scroll through the program guide at the speed and direction identified in the scrolling instruction. In some implementations, user device 310 may display ad banners during the scrolling of the program guide. Additional details regarding the display of ad banners are described below with respect to FIGS. 6 and 7.

Process 500 may also include receiving a subsequent signal from the accessory device and discontinuing scrolling (block 540). For example, user device 310 may receive a subsequent signal from accessory device 320 (e.g., when a button is selected on accessory device 320) after executing the scrolling instruction (e.g., when the scrolling instruction does not indicate that the program guide scrolling should be automatically discontinued). User device 310 may discontinue scrolling the program guide based on receiving the subsequent signal from the accessory device.

In some implementations, user device 310 may automatically discontinue scrolling at a stopping point in the program guide identified in the scrolling instruction (e.g., without receiving the subsequent signal). For example, user device 310 may discontinue scrolling after a particular period of time and/or after performing a discrete quantity of scroll operations.

Figure 6:
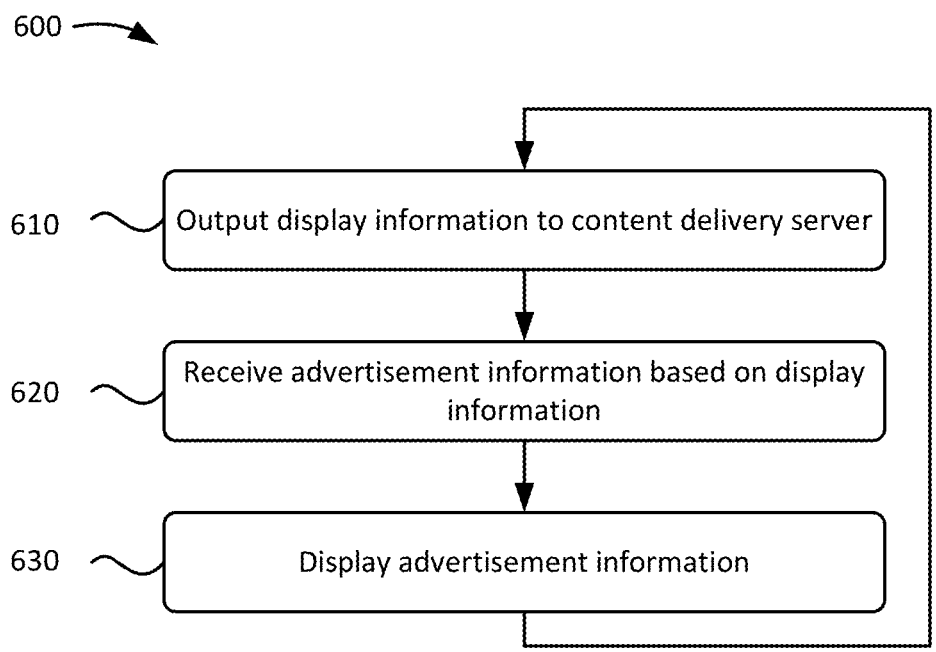
FIG. 6 illustrates a flowchart of an example process for displaying ad banners during automatic scrolling of a program guide.

FIG. 6 illustrates a flowchart of an example process 600 for displaying ad banners during automatic scrolling of a program guide. In some implementations, process 600 may be performed by user device 310. In some implementations, some or all of blocks of process 600 may be performed by one or more other devices.

As shown in FIG. 6, process 600 may include outputting display information to a content delivery system (block 610). For example, user device 310 may output the program guide display information to content delivery system 340. The display information may identify program guide information being displayed by user device 310. For example, the display information may identify that user device 310 is displaying program guide information for particular programs associated with particular channels and particular broadcasting times. Based on receiving the display information, content delivery system 340 may identify advertisements (and/or other content) associated with programs displayed in the program guide and identified in the program guide display information. For example, content delivery system 340 may identify advertisement content promoting a program displayed in the program guide. Additionally, or alternatively, content delivery system 340 may identify some other content associated with programs displayed in the program guide.

Process 600 may also include receiving advertisement information based on the display information (block 620). For example, user device 310 may receive advertisement information from content delivery system 340 (e.g., when content delivery system 340 identifies the advertisement information associated with the programs displayed in the program guide).

Process 600 may further include displaying the advertisement information (block 630). For example, user device 310 may display the advertisement information in the form of ad banners. The ad banners may be displayed within the program guide as the program guide continues to automatically scroll. As an example, user device 310 may display an ad banner promoting a program displayed in the program guide.

Process 600 may be repeated as user device 310 automatically scrolls through the program guide. For example, user device 310 may continuously output program guide display information as user device 310 automatically scrolls through the program guide, and may receive and display ad banners based on the continuously updated program guide display information. As a result, user device 310 may automatically scroll through ad banners in conjunction with automatically scrolling through the program guide. Further, the ad banners may be related to programs displayed in the program guide.

Figure 7:
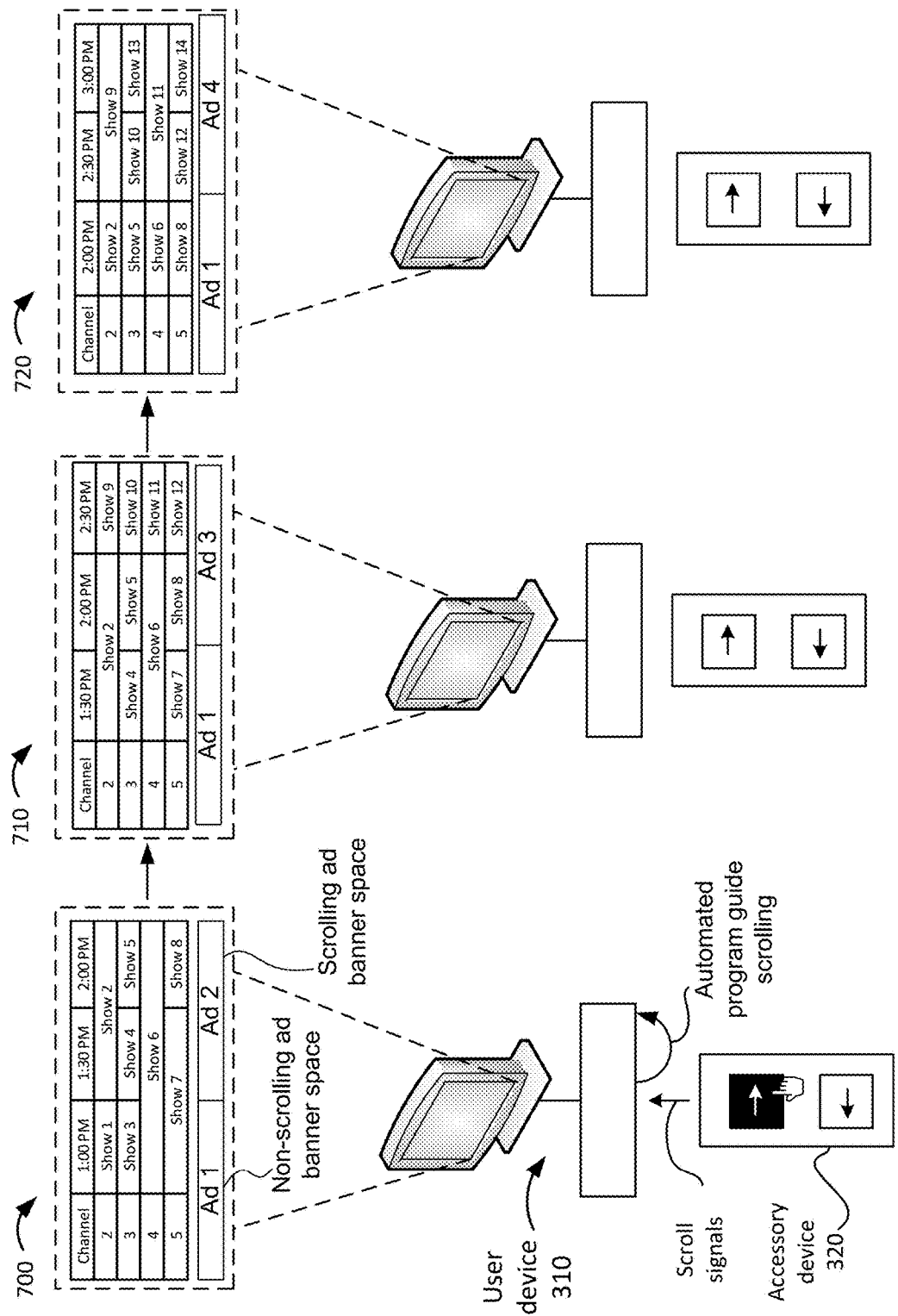
FIG. 7 illustrates an example implementation for automatically scrolling through ad banners in conjunction with automatically scrolling through a program guide.

FIG. 7 illustrates an example implementation for automatically scrolling through ad banners in conjunction with automatically scrolling through a program guide. As shown in FIG. 7, user device 310 may display a program guide. The program guide may include ad banners (e.g., a non-scrolling ad banner and a scrolling ad banner). The non-scrolling ad banners may display advertisements that may not automatically scroll in conjunction with automatic scrolling of the program guide (e.g., for advertisements having a minimum advertisement display time).

As shown in FIG. 7, user device 310 may receive scroll signals from accessory device 320. In FIG. 7, assume that user device 310 identifies a scrolling instruction based on the received scroll signals, and executes the scroll instruction to automatically scroll through the program guide. When user device 310 begins automatically scrolling through the program guide, user device 310 may automatically scroll through ad banners in conjunction with automatically scrolling through the program guide. For example, as shown in interface 700, user device 310 may display a program guide having a first ad banner (e.g., in a non-scrolling ad banner space), and a second ad banner (e.g., in a scrolling ad banner space). As further shown in interface 700, user device 210 may automatically scroll through the program guide based on receiving scroll signals from accessory device 320. In interface 710, user device 310 may automatically scroll through the program guide and may scroll to a third ad banner (e.g., in the scrolling ad banner space). Similarly, as shown in interface 720, user device 310 may automatically scroll through the program guide and may scroll to a fourth ad banner (e.g., in the scrolling ad banner space).

In some implementations, content delivery system 340 may include a billing system to store information identifying an amount of time that an advertisement was displayed in a non-scrolling banner space and a scrolling banner space on user device 310. The billing system may credit an account of an advertiser associated with the advertisement based on the amount of time that the advertisement was displayed. The billing system may credit the account at different rates based on whether the advertisement was displayed in a non-scrolling ad space or a scrolling ad space. The billing system may credit the account at a higher rate when an advertisement is displayed during automatic program guide scrolling versus when the advertisement is displayed during manual program guide scrolling.

In some implementations, the amount of time that the program guide is displayed (and hence advertisements are displayed within the program guide) may be increased as a result of the automated program guide scrolling. Thus, the amount of revenue generated from advertisements may be increased as a result of the increase in time that the advertisements are displayed. Further, the amount of revenue generated from advertisements may be increased as a result of additional advertisements being displayed in the scrolling ad space as the program guide automatically scrolls.

As described above with respect to process 600, user device 310 may output display information to content delivery system 340, receive advertisement information corresponding to the display information, and display ad banners relating to the program guide information displayed in the program guide. As a result, user device 310 may automatically scroll through ad banners when automatically scrolling through the program guide, thereby presenting additional ad banners to the user in relation to when only non-scrolling ads are displayed in the program guide.

Figure 8:
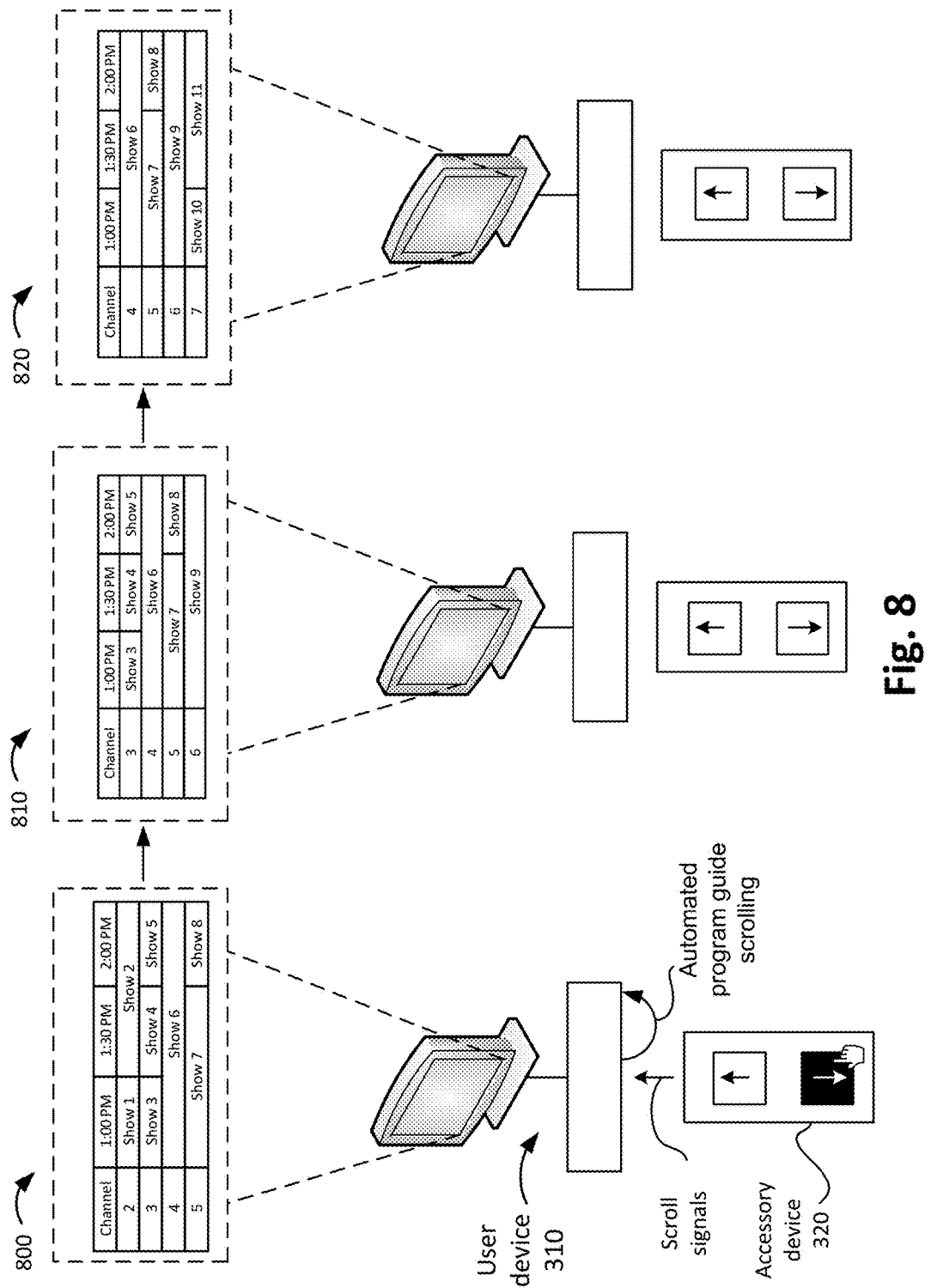
FIG. 8 illustrates an example implementation for automatically scrolling through a program guide.

FIG. 8 illustrates an example implementation for automatically scrolling through a program guide. For example, while examples described above are in the context of scrolling based on broadcast times of content, user device 310 may scroll through the program guide in downward or upward direction to display program information associated with different broadcast channels. As shown in FIG. 8, user device 310 may display a program guide, and may receive scroll signals from accessory device 320. In the example shown in FIG. 8, user device 310 may receive scroll signals corresponding to the selection of a directional down button (e.g., a button to direct user device 310 to scroll the program guide downwards to access program guide information for other broadcast channels). Based on receiving the scroll signals, user device 310 may identify a scrolling instruction (e.g., when the directional down button is selected on accessory device 320 greater than a threshold quantity of times within a threshold time period).

As shown in interface 800, user device 210 may begin automatically scrolling in a downward direction based on receiving scroll signals from accessory device 320 (e.g., a "triple-click" of the directional downward scroll button). As shown in interface 810, user device 310 may scroll in the downward direction without receiving additional scroll signals from accessory device 320. Similarly, as shown in interface 820, user device 310 may again scroll through the program guide in the downward direction without receiving additional scroll signals in a downward direction so that program information for additional broadcast channels may be displayed without requiring the user to repeatedly select the scrolling button on accessory device 320.

Figure 9:
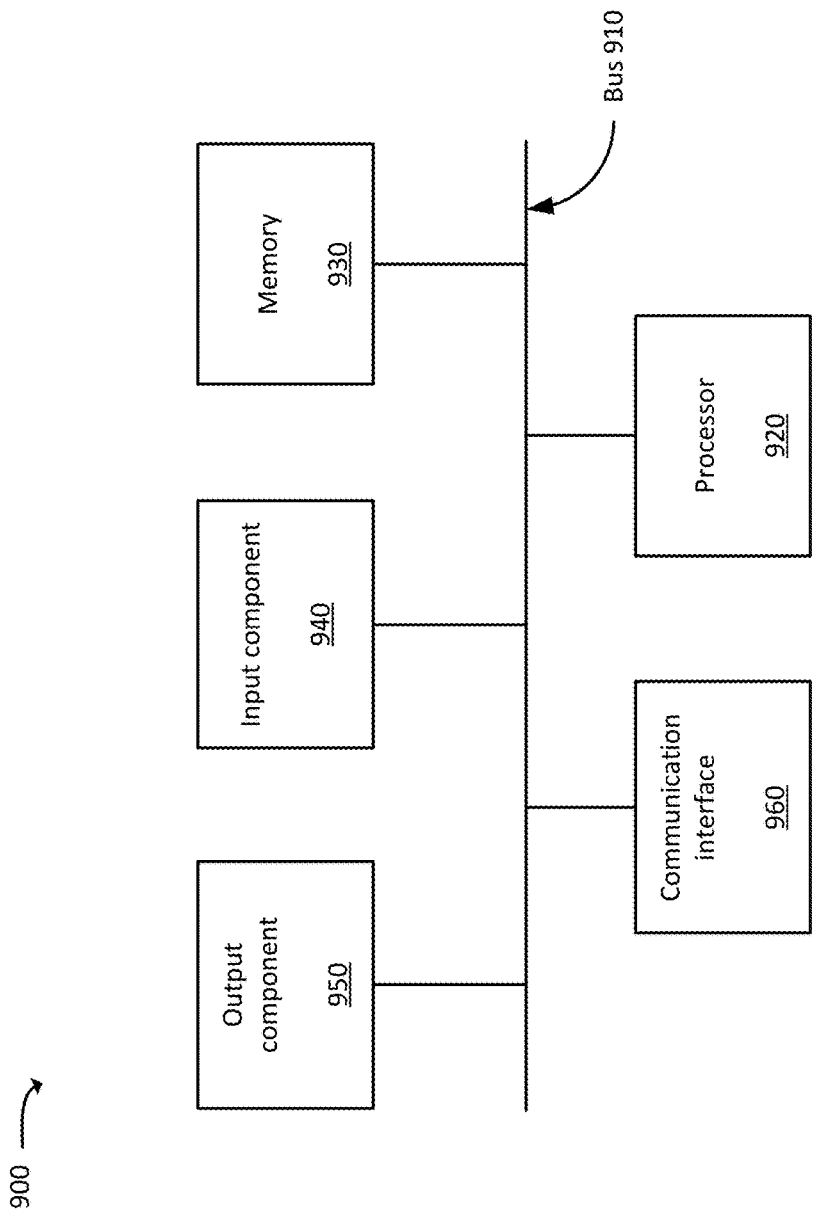
FIG. 9 illustrates example components of one or more devices, according to one or more implementations described herein.

FIG. 9 is a diagram of example components of device 900. One or more of the devices described above (e.g., with respect to FIGS. 1-3, 7, and 8) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes (LEDs), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 5 and 6, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 1-3, 7, and 8), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance.

Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
  receiving, by a user device and from an accessory device, two or more signals in a particular sequence, each particular one of the two or more signals respectively corresponding to a single keypress on the accessory device;
  determining, by the user device, that the two or more signals were received within a threshold period of time;
  determining, by the user device, a quantity of the two or more signals that were received within the threshold period of time;
  determining, by the user device, based on determining that the two or more signals were received within the threshold period of time, and further based on the quantity of signals that were received within the threshold period of time, a scrolling instruction corresponding to the two or more signals received in the particular sequence and within the threshold period of time,
    wherein determining the scrolling instruction further includes determining a scroll duration that is associated with the determined quantity of signals that were received within the threshold period of time;
  executing, by the user device, the scrolling instruction to continuously scroll through a program guide, displayed by the user device for the determined scroll duration, based on determining the scrolling instruction, the continuous scrolling occurring without receiving a subsequent signal from the accessory device, indicating a keypress on the accessory device, in addition to the two or more signals that each correspond to a single keypress on the accessory device; and
  after continuously scrolling for the determined scroll duration, ceasing scrolling through program guide based on an expiration of the scroll duration, and without receiving a subsequent signal from the accessory device indicating that scrolling should stop.

2. The method of claim 1, wherein the two or more signals include:
  two or more infrared signals,
  two or more radio frequency (RF) signals,
  two or more Bluetooth signals,
  two or more near-field communications (NFC) signals, or
  two or more Internet protocol (IP) based messages.

3. The method of claim 1, wherein the scrolling instruction identifies a scrolling speed and a scrolling direction,
  wherein executing the scrolling instruction causes the user device to continuously scroll through the program guide at the scrolling speed and in the scrolling direction.

4. The method of claim 1, further comprising:
  receiving a subsequent scrolling instruction;
  continuously scrolling through the program guide based on the subsequent scrolling instruction;
  receiving an additional signal from the accessory device after executing the subsequent scrolling instruction; and
  discontinuing scrolling through the program guide based on receiving the additional signal after executing the subsequent scrolling instruction.

5. The method of claim 1, further comprising:
  outputting, to a content delivery system, program information being displayed by the user device from the program guide;
  receiving, from the content delivery system, advertisement information associated with the program information; and
  displaying the advertisement information, from within the program guide, corresponding to the program information.

6. The method of claim 5, wherein outputting the program information causes the content delivery system to credit an account associated with a party of the advertisement information at a particular rate associated with the execution of the scrolling instruction.

7. The method of claim 1, wherein the two or more signals in the particular sequence correspond to a double-click or a triple-click of a particular control on the accessory device.

8. The method of claim 1, further comprising:
  determining a quantity of signals received within the threshold period of time; and
  determining a scroll speed based on the determined quantity of signals that were received within the threshold period of time,
  wherein a speed of the continuous scrolling is based on the determined scroll speed.

9. The method of claim 8, wherein a greater quantity of signals corresponds to a faster speed of the continuous scrolling.

10. A system comprising:
  a non-transitory memory device storing a plurality of processor-executable instructions; and
  a processor configured to execute the processor-executable instructions, wherein executing the processor-executable instructions causes the processor to:
    receive, from an accessory device, two or more signals in a particular sequence, each particular one of the two or more signals respectively corresponding to a single keypress on the accessory device;
    determine that the two or more signals were received within a threshold period of time;
    determine a quantity of the two or more signals that were received within the threshold period of time;
    determine a scroll duration that is associated with the determined quantity of signals that were received within the threshold period of time;
    determine, based on determining that the two or more signals were received within the threshold period of time, a scrolling instruction corresponding to the two or more signals received in the particular sequence and within the threshold period of time,
      wherein the scrolling instruction specifies the determined scroll duration associated with the determined quantity of signals that were received within the threshold period of time;
    execute the scrolling instruction to continuously scroll, for the determined scroll duration, through a program guide, displayed by the user device, based on determining the scrolling instruction, the continuous scrolling occurring without receiving a subsequent signal from the accessory device, indicating a keypress on the accessory device, in addition to the two or more signals that each correspond to a single keypress on the accessory device; and
    after continuously scrolling for the determined scroll duration, ceasing scrolling through program guide based on an expiration of the scroll duration, and without receiving a subsequent signal from the accessory device indicating that scrolling should stop.

11. The system of claim 10, wherein the two or more signals include:
two or more infrared signals,
two or more radio frequency (RF) signals,
two or more Bluetooth signals,
two or more near-field communications (NFC) signals, or
two or more Internet protocol (IP) based messages.

12. The system of claim 10, wherein the scrolling instruction identifies a scrolling speed and a scrolling direction,
wherein executing the processor-executable instructions, to execute the scrolling instruction, causes the processor to continuously scroll through the program guide at the scrolling speed and in the scrolling direction.

13. The system of claim 10, wherein executing the processor-executable instructions further causes the processor to:
receive a subsequent scrolling instruction;
continuously scroll through the program guide based on the subsequent scrolling instruction;
receive an additional signal from the accessory device after executing the subsequent scrolling instruction; and
discontinue scrolling through the program guide based on receiving the additional signal after executing the subsequent scrolling instruction.

14. The system of claim 10, wherein executing the processor-executable instructions further causes the processor to:
output, to a content delivery system, program information being displayed by the user device from the program guide;
receive, from the content delivery system, advertisement information associated with the program information; and
display the advertisement information, from within the program guide, corresponding to the program information.

15. The system of claim 14, wherein executing the processor-executable instructions, to output the program information, causes the processor to cause the content delivery system to credit an account associated with a party of the advertisement information at a particular rate associated with the execution of the scrolling instruction.

16. The system of claim 10, wherein the two or more signals in the particular sequence correspond to a double-click or a triple-click of a particular control on the accessory device.

17. A non-transitory computer-readable medium storing a set of processor-executable instructions, wherein execution of the processor-executable instructions causes one or more processors to:
receive, from an accessory device, two or more signals in a particular sequence, each particular one of the two or more signals respectively corresponding to a single keypress on the accessory device;
determine that the two or more signals were received within a threshold period of time;
determine a quantity of the two or more signals that were received within the threshold period of time;
determine a scroll duration that is associated with the determined quantity of signals that were received within the threshold period of time;
continuously scroll, for the determined scroll duration, through a program guide, displayed by the user device for the determined scroll duration, based on determining that the two or more signals were received within the threshold period of time, the continuous scrolling occurring without receiving a subsequent signal from the accessory device, indicating a keypress on the accessory device, in addition to the two or more signals that each correspond to a single keypress on the accessory device; and
after continuously scrolling for the determined scroll duration, cease scrolling through program guide based on an expiration of the scroll duration, and without receiving a subsequent signal from the accessory device indicating that scrolling should stop.

18. The non-transitory computer-readable medium of claim 17, wherein the two or more signals are a first set of signals, wherein the scroll duration is a first scroll duration, and wherein the quantity of signals is a first quantity of signals, wherein execution of the processor-executable instructions further causes the one or more processors to:
receive, from the accessory device, a second set of signals, each particular one of the second set of signals respectively corresponding to a single keypress on the accessory device;
determine a second quantity of the second set of signals, wherein the second quantity is a different quantity from the first quantity of the first set of signals;
determine a second scroll duration that is associated with the determined second quantity of the second set of signals, wherein the second scroll duration is a different duration from the first scroll duration;
continuously scroll, for the second scroll duration, through the program guide, based on determining that the second set of signals were received within the threshold period of time; and
after continuously scrolling for the second scroll duration, cease scrolling through program guide based on an expiration of the second scroll duration.

19. The non-transitory computer-readable medium of claim 17, wherein the two or more signals correspond indicate two or more keypresses of a single key of the accessory device.

20. The non-transitory computer-readable medium of claim 17, wherein a first signal, of the two or more signals, indicates a keypress of a first key of the accessory device, and wherein a second signal, of the two or more signals, indicates a keypress of a different second key of the accessory device.

* * * * *